(12) United States Patent
Ansari

(10) Patent No.: US 10,028,111 B2
(45) Date of Patent: Jul. 17, 2018

(54) SMART POSTAL MAILBOX DEVICE

(71) Applicant: Tarik Ansari, Walnut, CA (US)

(72) Inventor: Tarik Ansari, Walnut, CA (US)

(73) Assignee: Tarik Ansari, Walnut, CA (US)

( * ) Notice: Subject to any disclaimer, the term of this patent is extended or adjusted under 35 U.S.C. 154(b) by 0 days.

(21) Appl. No.: 15/072,901

(22) Filed: Mar. 17, 2016

(65) Prior Publication Data

US 2016/0278558 A1  Sep. 29, 2016

Related U.S. Application Data

(60) Provisional application No. 62/138,987, filed on Mar. 27, 2015.

(51) Int. Cl.

| | |
|---|---|
| *A47G 29/124* | (2006.01) |
| *H04W 4/12* | (2009.01) |
| *A47G 29/12* | (2006.01) |
| *A47G 29/122* | (2006.01) |
| *G08B 13/14* | (2006.01) |
| *G08B 25/00* | (2006.01) |
| *G08B 13/22* | (2006.01) |
| *G08B 21/18* | (2006.01) |

(52) U.S. Cl.
CPC .............. *H04W 4/12* (2013.01); *A47G 29/12* (2013.01); *A47G 29/121* (2013.01); *A47G 29/122* (2013.01); *A47G 29/1214* (2013.01); *A47G 29/1201* (2013.01); *A47G 29/1203* (2013.01); *A47G 29/1218* (2013.01); *A47G 29/1225* (2013.01); *G08B 13/1436* (2013.01); *G08B 13/22* (2013.01); *G08B 21/182* (2013.01); *G08B 25/009* (2013.01)

(58) Field of Classification Search
CPC ........ A47G 2029/145; A47G 2029/146; A47G 2029/148; A47G 2029/149; A47G 29/1203; G08B 13/1436; G08B 13/22; G08B 25/009
See application file for complete search history.

(56) References Cited

U.S. PATENT DOCUMENTS

| | | | |
|---|---|---|---|
| 5,917,411 A | 6/1999 | Baggarly | |
| 6,271,523 B1* | 8/2001 | Weaver | G01D 4/002 250/221 |
| 6,462,659 B1 | 10/2002 | Schuette | |
| 6,987,452 B2* | 1/2006 | Yang | A47G 29/141 232/36 |
| 7,506,796 B1 | 3/2009 | Hanna | |
| 8,655,795 B1* | 2/2014 | Kolchin | G06Q 10/04 340/569 |

(Continued)

*Primary Examiner* — Benyam Haile
(74) *Attorney, Agent, or Firm* — Gearhart Law LLC

(57) ABSTRACT

A smart postal mailbox device is disclosed that incorporates a camera and an imaging processing capability. When the device is in place inside a postal mailbox and is activated by a content element being placed in, or removed from, the mailbox, the camera obtains an image of the interior of the mailbox, which it then analyzes by first using pre-processing to correct for geometric distortion. The image is then decomposed using vision related algorithms into a discreet information dataset. This discrete data set is compared to previous data sets using a neural decision tree. If appropriate, the device transmits a message informing a remote user of the current state of the mailbox.

19 Claims, 4 Drawing Sheets

(56) References Cited

U.S. PATENT DOCUMENTS

| | | |
|---|---|---|
| 2002/0024438 A1 | 2/2002 | Roberson |
| 2010/0141425 A1* | 6/2010 | Tracey ................. B65H 75/403 340/539.1 |
| 2011/0234402 A1* | 9/2011 | Byrne ................. A47G 29/1214 340/540 |
| 2013/0034273 A1* | 2/2013 | Mardirossian ..... G06K 9/00288 382/118 |
| 2013/0147626 A1* | 6/2013 | Hammoud ............. G08B 13/22 340/569 |
| 2015/0062880 A1 | 3/2015 | Kleinschmidt |
| 2016/0374494 A1* | 12/2016 | Geng ................... A47G 29/141 232/17 |

\* cited by examiner

SMART POSTAL MAILBOX DEVICE

CROSS-REFERENCE TO RELATED APPLICATIONS

This application claims priority to U.S. Ser. No. 62/138,987 filed on Mar. 27, 2015, the contents of which are hereby fully incorporated herein by reference.

BACKGROUND OF THE INVENTION

Field of the Invention

The present invention of a smart postal mailbox device relates to the general field of human necessities, and may be considered furniture in that mailboxes are mail receptacles, or letter-boxes, which may be miscellaneous containers for domestic or household use; and it relates more particularly to devices for enabling mail receptacles, or letter-boxes, to become smart postal mailboxes by the incorporation of motion detection devices functionally integrated together with cameras, imaging processing capabilities and transmitters for sending messages to remotely located receivers.

Description of Related Art

The relevant prior art includes:

US Patent Application 20020024438 published by Orin A. Roberson on Feb. 28, 2002 entitled "Mail check method and system" that describes a method and system designed to allow the user to determine mail status of a mailbox without having to go to the mailbox. Using the internet, telephone, cell telephone, computer (with special software), computer with website, television website, or a special transmitter/receiver, a person can receive information about the status of the mailbox (if the mailbox contains any mail) regardless of the distance of the user from the said mailbox. The user is able to receive a picture/image of the mailbox's contents from remote locations where picture/image technology is supported and accepted. i.e. Computer, PDA, wireless web devices etc. This allows the user to evaluate the contents of the mailbox/container.

U.S. Pat. No. 6,987,452 issued to Yang on Jan. 17, 2006 entitled "iBOX with home delivery auto-receipt system" that describes an iBOX, an intelligent multifunction mailbox, that combines several technologies, such as video camera, remote programmable keypad, PN junction thermoelectric unit, powerline communication, wire or wireless communication and Internet together to provide a more secure, multi-functional mailbox. It resolves several short comes of the traditional signature-required delivery U.S. Pat. No. 6,462,659 issued to Schuette on Oct. 8, 2002 entitled "Portable remote mail detection system" that describes a device and system for checking the presence or absence of mail in a neighborhood delivery mailbox which has a plurality of individual mailboxes. The interrogation and response signals are triggered by remote control from a nearby location, for example from a moving vehicle. A custom identifying means is used to identify a selected mailbox from a cluster of mailboxes. This device and system thereby saves the operator time and provides a secure means of detecting mail from a remote location. The unit may be made miniature, as well as modular. The circuits described can be an integrated circuits or can be made of multiple discrete elements. The hand-held remote interrogator includes an antenna connected to a transmitter, and a receiver which is also connected to an antenna. A microcontroller is also provided to save, store and transmit data responsive to a query from a portable, hand held remote interrogator.

U.S. Pat. No. 5,917,411 issued to Baggarly on Jun. 29, 1999 entitled "Electronic mailbox with keypad alarm system" that describes an electronic mailbox including a mailbox housing, a door, an alarm system, a door sensor a first timer, a second timer, a programmable controller, and a power source. Housing defines an opening of a size and shape to receive mail. Door is of a size and shape to cover opening. Door is movably operable between an open state and a closed state. The alarm system is controlled by the controller between a first unarmed state and a second armed state. A keypad, door sensor and timers input signals to controller. The timers along with the door state determine whether the armed state or unarmed state is in effect. Controller sends output signals to activate the alarm system when the door is opened by an unauthorized user. An authorized user inputs a deactivating code into the keypad to deactivate the alarm system. Optional LED mail deposit indicator, latching (locking) mechanism, and illuminating lights(s) may be provided.

U.S. Pat. No. 7,506,796 issued to Robert L. Hanna on Mar. 24, 2009 entitled "Mail delivery notification device" that describes a transmitting mechanism for indicating the deposit of mail into mailboxes having doors that pivot about a horizontal hinge. Such mailboxes normally identified as curb side, wall mounted, and slot type. The transmitting mechanism is comprised of an adjustable knob capable of positioning an adjoining tilt switch, such that the mechanism can be set to send a signal at any preferred mailbox opening. As the mailbox door is opened past a predetermined angle, the tilt switch completes a circuit which emits a signal to a remote receiver which activates a sound and visual alarm indicating that mail has been deposited in the mailbox.

Various implements are known in the art, but fail to address all of the problems solved by the invention described herein. One embodiment of this invention is illustrated in the accompanying drawings and will be described in more detail herein below.

BRIEF SUMMARY OF THE INVENTION

An inventive smart postal mailbox device is disclosed.

In a preferred embodiment, the smart postal mailbox device may incorporate a camera and an imaging processing capability. When the device is in place inside a postal mailbox and is activated by a content element being placed in, or removed from, the mailbox, the camera may obtain an image of the interior of the mailbox, which it may then analyzes by, for instance, first using pre-processing to correct for geometric distortion. The image may then be decomposed using, for instance, vision related algorithms into elements such as, but not limited to, a discreet information dataset. This discrete data set may then be compared to, for instance, previous data sets using techniques such as, but not limited to, a neural decision tree. If, based on the comparison of the datasets and other settings such as, but not limited to, user selected settings, the software deems it appropriate to inform the user, the device may transmit a message containing information pertinent to the current state of the mailbox.

In a further preferred embodiment, the smart postal mailbox device may include a motion sensor, a camera, a flashlight, a microprocessor and a power supply. These may all be arranged in a common housing, and functionally interconnected to each other. The smart postal mailbox device may be placed in a conventional postal mailbox by, for instance, having a suitable mounting device on an outer, upper surface of the device housing so that it may be secured to the inside upper surface of the mailbox.

When the device is in place inside a postal mailbox and the motion sensor is activated by, for instance, having a content element either place in, or removed from, the mailbox, the device may cause a content-altered signal to be issued. However, before issuing the signal the device may wait a predetermined time that may, for instance, be from 1 to 10 seconds, to allow for content being delivered in small, closely-timed batches. Once issued, the content-altered signal may trigger the flashlight to illuminate the interior of the mailbox, and the camera to obtain an image of the illuminated interior of the mailbox. Having obtained the image of the mailbox interior, a wireless communications module that may also be located within the device housing and functionally connected to the microprocessor, may emit a wireless message that may include a digital image of the mailbox interior.

The wireless message may, for instance, be sent to a local Wi-Fi hotspot, and may then be relayed-on via a digital network such as, but not limited to, the Internet, to a user as, for instance, an email message that may show them the current state of the mailbox.

In a further preferred embodiment of the invention, the microprocessor may incorporate an image processing module and may be configured to store images, and make comparisons between previously stored images and the current image so as to only to send messages when significant changes had occurred such as, but not limited to, when one or more content elements have been added to, or removed from, the mailbox.

The image processing module may further include an optical character recognition module that may be used to read, or decipher, information printed on the content elements such as, but not limited to, names and/or addresses of senders or intended recipients.

The messages sent from the smart postal mailbox device may also include alerts such as, but not limited to, a new mail alert, a low battery alert and an unusual hour of opening alert, or some combination thereof.

Therefore, the present invention succeeds in conferring the following, and others not mentioned, desirable and useful benefits and objectives.

It is an object of the present invention to provide a device that oversees the contents of a mail box to determine when mail is delivered or retrieved from a mailbox and deliver the results of that determination to the intended recipients.

Yet another object of the present invention is to provide a device that images the contents of a mailbox, analyzes the images to extract mail images and data, compares the result to a last known state of the mailbox and reports the conclusions to the intended recipients.

Still another object of the present invention is to provide a means for a recipient to monitor their mailbox and receive updates and previews regarding the current contents of the mailbox on a networked device while away from their mailbox.

DETAILED DESCRIPTION OF THE INVENTION

Figure 1:
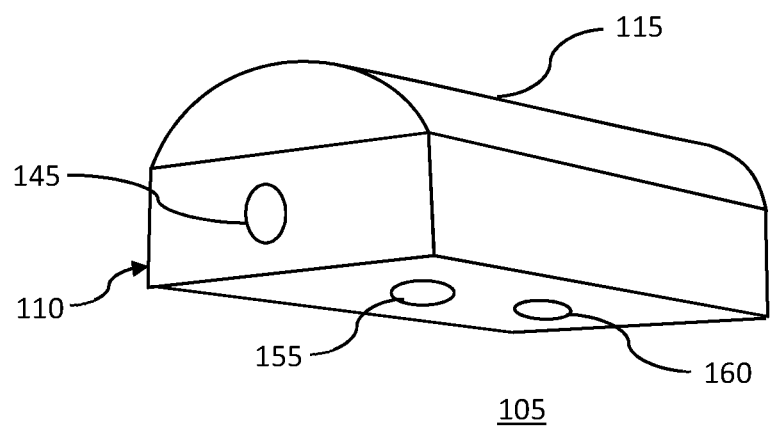
FIG. 1 shows a schematic, isometric view of an exemplary embodiment of the present invention.

The preferred embodiments of the present invention will now be described with reference to the drawings. Identical elements in the various figures are identified with the same reference numerals.

Various embodiments of the present invention are described in detail. Such embodiments are provided by way of explanation of the present invention, which is not intended to be limited thereto. In fact, those of ordinary skill in the art may appreciate upon reading the present specification and viewing the present drawings that various modifications and variations can be made thereto.

In a simple, preferred embodiment, a smart mailbox device may simply include a camera, a microprocessor, a source of power, a communications channel and a software module operable on the microprocessor. With the microprocessor being functionally connected to the camera, the source of power and the communications channel, the software module may perform image analysis on an image obtained by the camera while located in a mailbox. Based on that image analysis, the software module may make a decision on whether or not to send a message on to a user of the device. For instance, if a result of the image analysis indicates that there has been a change in a status of the mailbox, and if that change of status exceeds a predetermined level of importance, then the software module may generate and send a message. The change in status of the mailbox may, for instance, be if a mail element has been added to, or removed from, the mailbox. The predetermined level of importance may, for instance, be a criterion such as, but not limited to, the address of the sender or the recipient of a mail element, a size, shape or color of a mail element or some combination thereof.

The image processing may, for instance, be performed by an image processing module and may include pre-processing elements such as, but not limited to, correcting for geometric and/or color distortion. Having performed pre-processing, the image processing module may use computer vision related algorithms to, for instance, decompose the image into discreet information using one or more sets of variable parameters and computer vision rules. The discreet information may include elements such as, but not limited to, information about corners, edges and their relative orientation to each other, including the angles, distances and projected points of intersection of extensions, or some combination thereof. Such information may, for instance, be used to identify envelopes or boxes.

The image processing module may then use machine learning methods and algorithms such as, but not limited to, one or more fixed rules, or a neural decision net built from training on a training dataset of images, or some combination thereof, in order to perform a function such as comparing the gathered, most recent discreet information dataset to that of a last known discreet information dataset. As a result of such a comparison, and with due account for optional user settings, the image processing module may determine where or not to send a user a notification and the nature of the that notification.

A neural network, or decision net, may be built up independently of the device and uploaded to the device either at an assembly factory, or at a later date as a software update. In a further, preferred embodiment of the invention, the neural decision net may be managed directly on the device and trained by the user. In a further embodiment, the image processing may be done all, or in part, on the server side, i.e., the device may send an image to a server, with one or more software modules operative on the server performing some or all of the image processing functions including, for instance, the decision on whether to send a message and the nature of the message.

FIG. 1 shows a schematic, isometric view of an exemplary embodiment of the present invention. The smart postal mailbox device 105 may include a housing 110 that may incorporate a motion sensor 145, a camera 155 and a flashlight 160. The housing 110 may have a housing outer, upper housing surface 115 sized and shaped to match a mailbox in which the device is intended to be placed and used.

Figure 2:
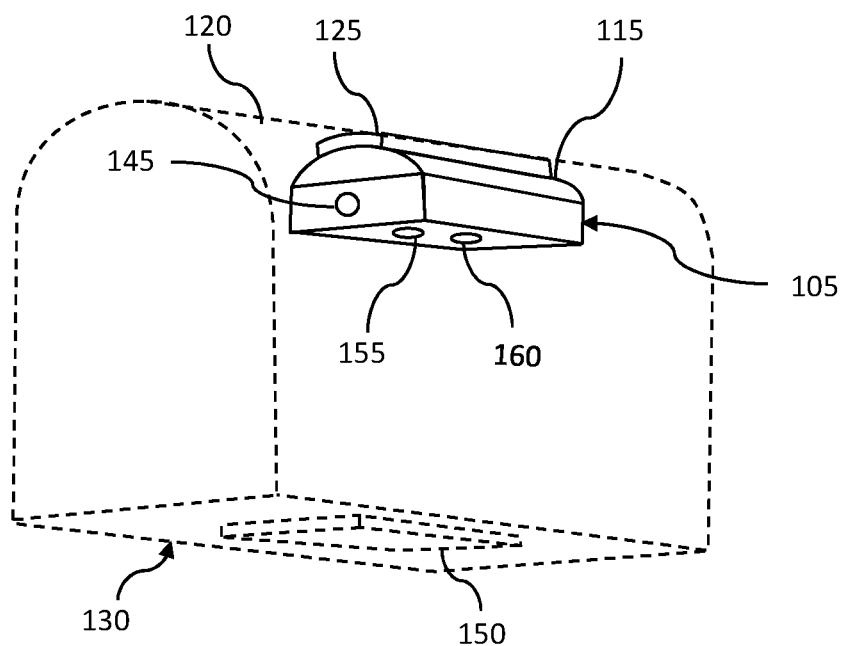
FIG. 2 shows a schematic, isometric view of a further exemplary embodiment of the present invention located within a mailbox.

FIG. 2 shows a schematic, isometric view of a further exemplary embodiment of the present invention. In FIG. 2, the smart postal mailbox device 105 is shown located within a mailbox 130, shown in dashed outline for clarity. This placement, or fixing, of the device within the mailbox may, for instance, be accomplished by having the device's housing's outer, upper surface sized and shaped to conform to an inside, upper surface 120 of the mailbox 130. A mounting device 125 may then be located on the outer, upper housing surface to attach it to the inside upper surface of the mailbox. The mounting device 125 may be an adhesive means such as, but not limited to, double-sided tape, a hook-and-loop combination, or some combination thereof, or it may be a physical means such as, but not limited to, bolts or screws, or some combination thereof.

In a further preferred embodiment of the invention, the housing outer, upper housing surface 115 may be detachable from the lower part of the smart postal mailbox device 105 so as to facilitate easy removal of the functional components of the device for repair or replacement.

The smart postal mailbox device 105 is preferably located within the mailbox 130 such that when the motion sensor 145 triggers the flashlight 160 to illuminate the interior of the mailbox, the camera 155 is positioned so as to take an image of any content elements 150 that may be located on the floor of the mailbox. Because of the relatively low height of many mailboxes, the camera 155 may be equipped with suitable optics such as, but not limited to, a fish-eye lens, so as to obtain an image of the entire floor, or interior, of the mailbox.

Although the mailbox in FIG. 2 is drawn to suggest a typical suburban mailbox, one of ordinary skill in the art will appreciate that, without undue experimentation, the device of the present invention may be fitted to mailboxes having a variety of shapes and sizes, such as, but not limited to, mailroom mailboxes, door mounted mail-slot-boxes, condominium mailboxes and other rural mailboxes shapes.

Figure 3:
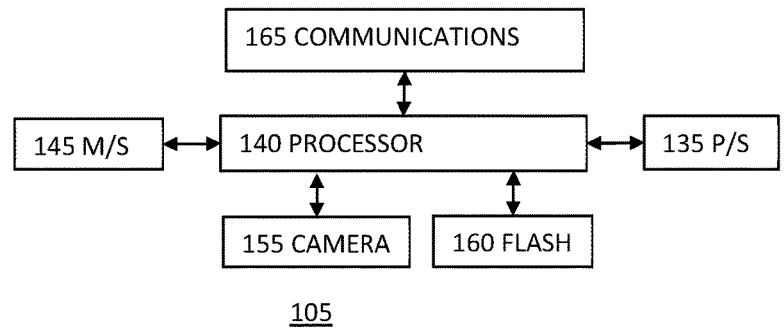
FIG. 3 shows a schematic functional layout of an exemplary embodiment of the present invention.

FIG. 3 shows a schematic functional layout of an exemplary embodiment of the present invention.

As shown in FIG. 3, the smart postal mailbox device 105 may include a motion sensor 145, a camera 155, a flashlight 160, a power supply 135 and a wireless communications module 165, all of which may be functionally connected via a microprocessor 140.

The microprocessor 140 may, for instance, be any typical digital signal processor that may be programmed to perform functions, including control functions of the devices to which it may be connected. The microprocessor 140 may also include digital memory for storing data such as, but not limited to, software modules and digital images that may be obtained by the camera 155. There may also, or instead, be a digital memory module that may be part of the smart postal mailbox device 105 and may be functionally connected to the microprocessor 140.

The motion sensor 145 may, for instance, be a visible light photo-diode, an infra-red diode or a passive infrared (PR) motion detector, or some combination thereof. These devices may be configured to transmit a signal to the microprocessor 140 when, for instance, the current in the photo-diode or PIR-detector exceeds a certain threshold. The photodiode or PIR-detector trigger threshold may, for instance, be indicative of a door of the mailbox being opened, or of a different object being located within the mailbox.

The motion sensor 145 may also, or instead, include a make/break switch activated by the opening or closing of a mailbox access door. Such a switch may, for instance, be activated by a magnetic patch attached to a mailbox door and situated so as to activate a magnetic switch when the mailbox door is opened or closed.

The flashlight 160 may be a low-power consuming, efficient light emitting illuminator such as, but not limited to, one or more white-light Light Emitting Diodes (LEDs), one or more mono-color LEDs, or some combination thereof.

The camera 155 may be a digital camera that may include a lens and an image sensor array. The image sensor array may, for instance, be an array of semiconductor charge-coupled devices (CCD), or complementary metal-oxide-semiconductor (CMOS), forming a device for obtaining a digital image as an array of pixels. The digital images obtained may range in size from 1 k pixels to as much as 16 M pixels though it is preferably in a range of 3 to 8 M pixels, and most preferably 5 M pixels. The number of pixels in the image may be a compromise between a need for feature resolution, which is preferably a fine resolution, requiring more pixels, and the file size of the image, which is preferably kept small for economy of storage and transmission by limiting the number of pixels. In a further embodiment of the invention, these two objectives may be met by obtaining high resolution images having a total of up to 16 M pixels or more for use in image processing such as, but not limited to, optical character recognition and image to image comparison, and then having an optical filtering module operative on the microprocessor that may reduce the pixel size to 1 M pixels or less for transmission and/or storage.

The camera lens may be any conventional lens, though in a preferred embodiment it may be a fisheye lens to facilitate wide angle viewing, and in a more preferred embodiment it may be a Fresnel fisheye lens as that may be a low-cost, flat, space saving structure that facilitates wide angle viewing.

The power supply 135 may be incorporated in the device housing or may be incorporated in a separate enclosure, or some combination thereof. The power supply 135 may be one or more conventional electric batteries, such as, but not limited to, an alkaline dry cell battery, a zinc-carbon battery, a rechargeable nickel-based battery, a rechargeable nickel metal hydride battery or a lithium ion battery, or some combination thereof.

In a further preferred embodiment of the present invention, the power supply 135 may include one or more solar panels that may, for instance, be situated on the outer surfaces of the mail box.

The wireless communications module 165 may a hardware or software module, or combination thereof, configured to communicate using one of the standard, well-known, short range, low power wireless communication protocols or standards such as, but not limited to, the Wi-Fi, or 802.11, standard, of the Institute of Electrical and Electronics Engineers (IEEE); the Bluetooth protocol of Ericsson; the IEEE ZigBee, or 802.15.4, standard; the Global System for Mobile Communications (GSM) standard of the European Telecommunications Standards Institute (ETSI); or some combination thereof.

The wireless communications module 165 may be functionally connected to an antenna that may be positioned external to the mailbox so as to facilitate wireless, electromagnetic communication.

In an alternative embodiment, the communications module may be a more conventional wired link such as, but not limited to, an Ethernet cable, a USB cable or some combination thereof. Such cables may also be used as a means of providing a power supply to the smart postal mailbox device 105 in the form, for instance, of a Power-over-Ethernet implementation of the Ethernet standard.

Figure 4:
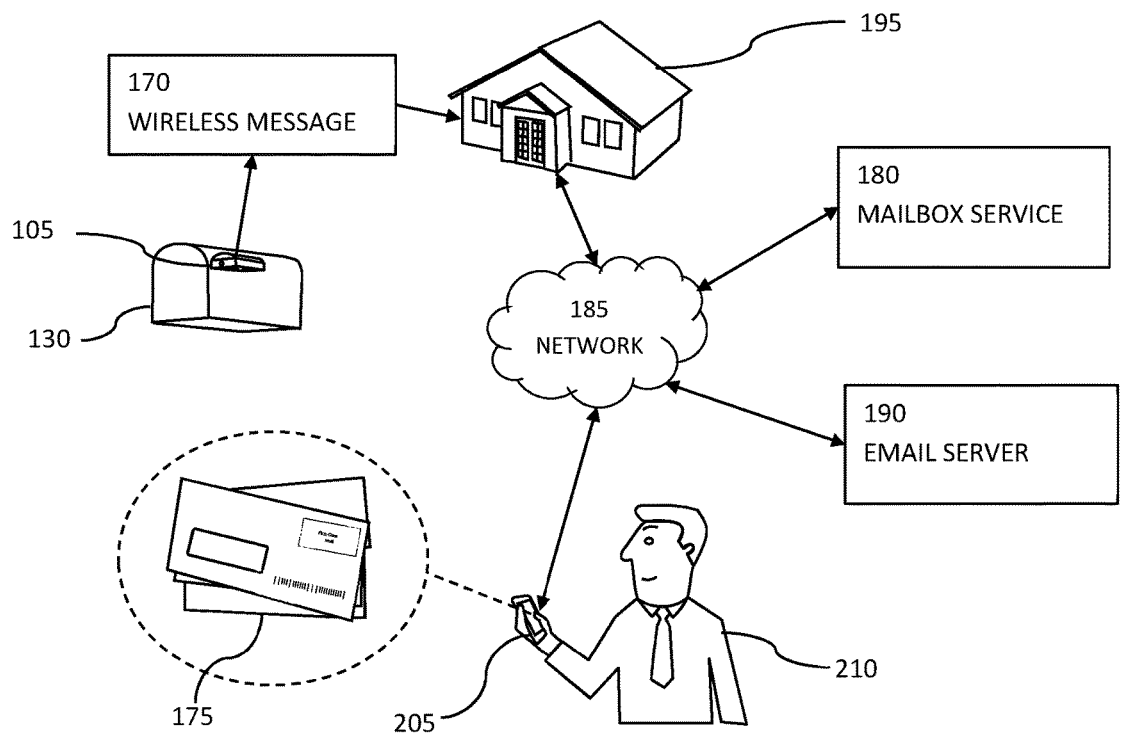
FIG. 4 shows a schematic view of a use of an exemplary embodiment of the present invention.

FIG. 4 shows a schematic view of a use of an exemplary embodiment of the present invention.

The smart postal mailbox device 105 may be located within a mailbox 130. When activated by a suitable event, such as, but not limited to, the placement or removal of a content element, the smart postal mailbox device 105 may transmit a wireless message 170. This message may, for instance, include a digital image of the interior of the mailbox. The message may also, or instead, include an analysis of the contents such as, but not limited to, a message to say that the contents are unaltered or that a content element has been added or removed, and may also include a name of a sender of an element or of an intended recipient of the element.

The wireless message 170 may be received via a nearby message receiving station such as, but not limited to, a residential Wi-Fi unit 195, a cable network, a wireless telephone network, or some combination thereof.

Form the residential Wi-Fi 195, the message may then be transmitted via a digital communications network 185 such as, but not limited to, the Internet, a telephone network, a wireless telephone network, a cable network, or some combination thereof.

The message may reach a user 210 on the user's smartphone 205 or other mobile digital communications device. The user may, for instance, be able to view a current interior image 175 showing the current contents of his/her mailbox.

The wireless message 170 may also, or instead, be relayed via the digital communications network 185 to a mailbox service 180 or an email server 190.

The mailbox service 180 may, for instance, provide services such as, but not limited to, responding to the message by physically visiting the mailbox and obtaining delivered content.

The email server 190 may, for instance, store the message on a server for later collection by the user.

Figure 5:
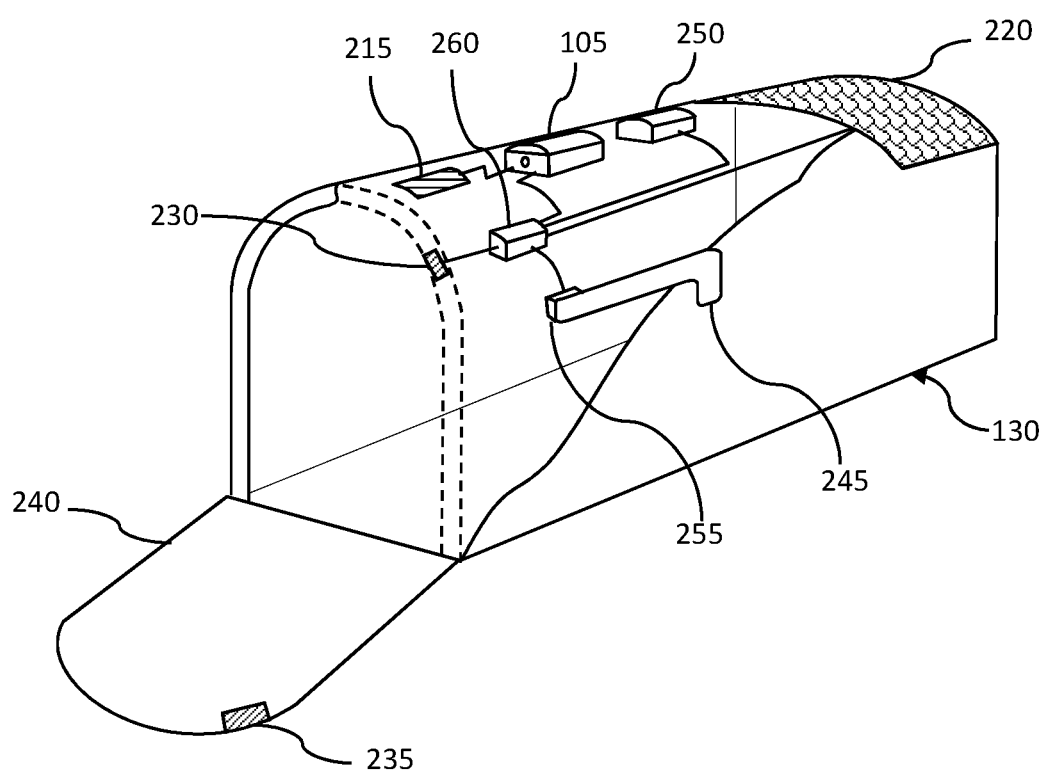
FIG. 5 shows a schematic, isometric, partial cut-out view of yet another exemplary embodiment of the present invention in place in a mailbox.

FIG. 5 shows a schematic, isometric view of yet another exemplary embodiment of the present invention.

In FIG. 5, the mailbox 130 is shown partially cut away to more clearly display the smart postal mailbox device 105 and the possible associated hardware that may form part of various embodiments of the invention.

As shown in FIG. 5, the smart postal mailbox device 105 may have attached to it an electromagnetic antenna 215, an auxiliary battery 250 and a solar panel 220. These may be functionally connected to the device via an auxiliary controller 260.

The auxiliary controller 260 may also functionally connect a mailbox flag position indicator switch 255 to the smart postal mailbox device 105. The mailbox flag position indicator switch 255 may, for instance, read the position of the mailbox flag 245 and may, therefore, be indicative of whether or not a content element left for collection has been collected.

The auxiliary controller 260 may also functionally connect a magnetic contact switch 230 to the device. The magnetic contact switch 230 may, for instance, be activated by a magnetic patch 235 located on the mailbox weather door 240. The magnetic contact switch 230 may, therefore, be indicative of when the mailbox door is closed or opened.

Figure 6:
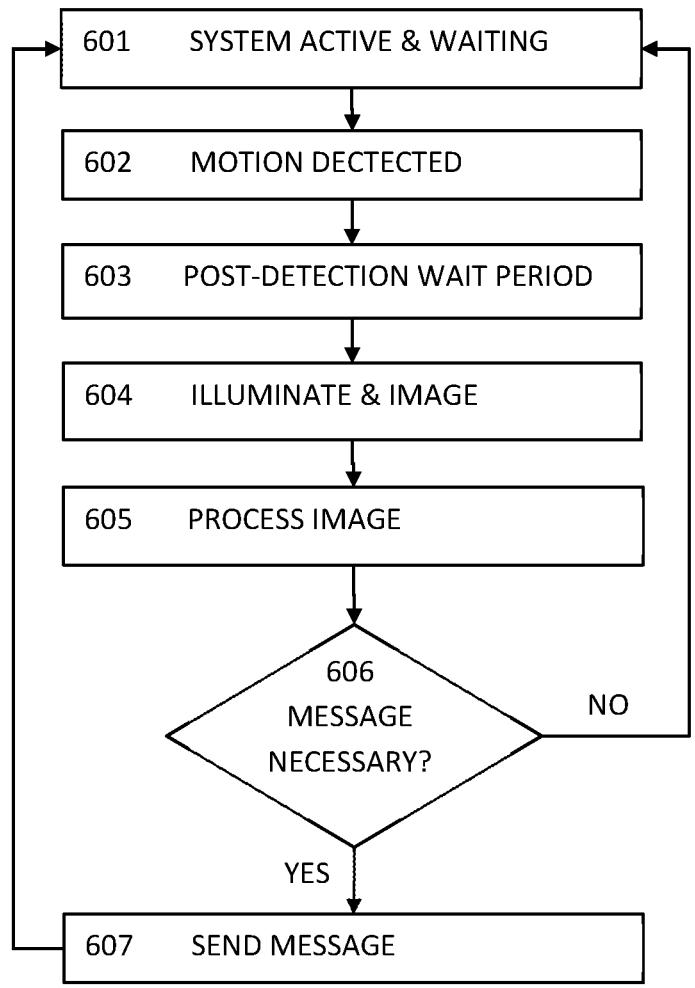
FIG. 6 shows a schematic flow diagram of exemplary steps in the use of an exemplary embodiment of the present invention.

FIG. 6 shows a schematic flow diagram of exemplary steps in the use of an exemplary embodiment of the present invention.

In Step 601 "System active and waiting", the smart postal mailbox device may be located in a mailbox and be functionally on, waiting for an event to occur.

In Step 602 "Motion Detected", the device's motion sensor may have detected a change indicative of an event such as, but not limited to, a content element being place in, or removed from, the mailbox.

In Step 603 "Post-Detection Wait Period", the device may wait for a pre-determined time after having detected motion. This wait period may be as little as 1 second or as long as 10 seconds. The purpose of the wait period may be to allow for content elements to be delivered over a short period of time. The mail deliverer may, for instance, be posting mail in a number of closely situated mailboxes and be moving from one to the other as they go through a basket of mail to be delivered. By waiting, the device may avoid taking too many pictures and may, therefore, avoid using up battery power.

In Step 604 "Illuminate and Image", the motion sensor, in conjunction with the microprocessor, may have, after a suitable delay, issued a content-altered signal. The microprocessor may then use this signal to trigger the flashlight to illuminate the mailbox, and the camera to obtain an image of the illuminated interior of the mailbox.

In Step 605 "Process Image", software modules operative on the microprocessor may evaluate the image obtained with the camera in the previous step.

In a simple embodiment, this processing may simply take the form of transforming the image to a place and form suitable for transmitting in a message. This may, for instance, take the form of storing the image in a memory unit and/or converting the image into a suitable, possibly compressed format such as, but not limited to, the well-known JPEG or TIFF formats.

In more advanced embodiments, the smart postal mailbox device may include image processing modules with functions such as, but not limited to, the ability to transform images obtained with a fisheye lens into a more conventional rectilinear form, the ability to compare current images with previous images to ascertain a degree of difference between them, and the ability to perform optical character recognition on the images, or some combination thereof.

In Step 606 "Message Necessary?" software modules operative on the microprocessor may be programmed to perform the task of deciding whether or not to send a message to the user. Such a decision may be predicated, in part, on the results of the image processing performed in the previous step, 605.

For instance, a comparison of the most recent, or current interior image with a previous, or prior interior image that may be stored in the processors digital memory module, may reveal that no significant change may have occurred between them and, therefore, it may not be necessary to send a message. Because the smart postal mailbox device may have limited power resources, it may be useful to limit the number of messages sent so as to conserve power resources.

The determination of whether a significant change has occurred within the mailbox may incorporate user selected thresholds that may include factors such as, but not limited to, a percentage of pixels that have changed. If, for instance, if more than 10% of corresponding pixels have changed value by more than an average change in overall pixel values, it may be determined that a message may be sent, and that the message may include a copy of the digital image of the current state of the interior of the mailbox.

If in Step 606, a determination that it is not necessary to send a message is made, the device may return to Step 601 and may remain active while waiting for a next event to occur.

If, however, in Step 606, a determination to send a message is made, the device may proceed to Step 607 and may emit, or send, a message via the wireless communications module. Such a message may be an electromagnetic signal comprising a digital encoding of the current interior image.

The message sent in Step 607 may also, or instead, include status alerts, such as, but not limited to, a new mail alert, a low battery alert and an unusual hour of opening alert.

Once the message is sent, the device may proceed to Step 601 and may remain active while waiting for a next event to occur.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A smart device, comprising:
a camera;
a microprocessor functionally connected to said camera and to a source of power and to a communications module;
a software module, operable on said microprocessor, said camera, said microprocessor, said communications module, and said software module being located in a first housing;
said first housing having an outer housing surface sized and shaped to conform to a mailbox inner surface;
wherein said software module is configured to analyze the image of the contents of the mailbox, and wherein when a result of said image analysis is equal to or exceeds a predetermined level of importance of the contents of the mailbox, a message is transmitted by said microprocessor via said communications channel to an electronic device if said result of said image analysis indicates a change in a status, and if said change of status exceeds a user selected predetermined preference;
wherein said user selected predetermined preference is based on a mail deposition event;
wherein said user selected predetermined preference is based on a percentage change of said pixels of said image and on said preference of said result of analysis of said image of said contents of said mailbox.

2. The mailbox device of claim 1 further comprising:
a mounting device located on said housing outer housing surface for attaching said device to said mailbox inner surface;
a motion sensor, functionally connected to said microprocessor and said source of power, and located within said housing such that when a content element is placed in, or removed from, said mailbox, said microprocessor waits a predetermined length of time of at least one-second after a last sensed motion, and then provides a content-altered signal to said microprocessor;
a flashlight functionally connected to said microprocessor and said source of power, and located within said housing such that when said housing is attached to said mailbox inner surface, and said camera receives said content-altered signal, said flashlight illuminates an interior of said mailbox and said camera provides a current interior image of the illuminated interior of said mailbox;
a wireless communications module, located within said housing and functionally connected to said source of power, and functionally connected to said microprocessor;
a wireless message, comprising an electromagnetic signal comprising a digital encoding of said current interior image, emitted by said wireless communications module if said result of said image analysis performed by said software module on said image obtained using said camera indicates a change in a status of said mailbox, and if said change of status meets or exceeds said user selected predetermined preference.

3. The mailbox device of claim 2, further comprising an electromagnetic antenna located on an exterior of said mailbox and functionally connected to said wireless communications module.

4. The mailbox device of claim 2, further comprising a solar panel located on an exterior of said mailbox and functionally connected to said source of power.

5. The mailbox device of claim 2, wherein said motion sensor comprises a photo-diode, and wherein detection of an opening of said mailbox is determined by a signal from said photo-diode exceeding a predetermined threshold.

6. The smart device of claim 1, wherein said image processing module further comprises an optical character recognition module.

7. The mailbox device of claim 1, wherein said microprocessor module further comprises a neural network.

8. The mailbox device of claim 2, wherein said motion sensor further comprises a make/break switch activated by opening or closing of a mailbox access door.

9. The mailbox device of claim 2, wherein said wireless message further comprises a status alert selected from a group of statuses consisting of a new mail alert, a low battery alert and an unusual hour of opening alert.

10. The mailbox device of claim 1, wherein there is a delay of at least 1 second between motion being detected and an image being obtained.

11. The mailbox device of claim 1, wherein the smart device is activated by an auxiliary controller.

12. The mailbox device of claim 11, wherein the auxiliary controller connects to a mailbox flag.

13. The mailbox device of claim 1, wherein the first housing is mounted inside the mailbox.

14. The smart device of claim 1, wherein the first housing is attached to an upper, inner surface of the inside of the mailbox.

15. The mailbox device of claim 1, wherein the user selected predetermined preference is at least one of a sender name or sender address of the contents.

16. The smart mailbox device of claim 1, wherein the camera is motion activated.

17. The smart device of claim 5, wherein said motion sensor is directed at a door of said mailbox.

18. The smart device of claim 2, wherein said motion sensor comprises a passive infrared motion detector, and wherein detection of a content element being placed in, or removed from said, mailbox is determined by a signal from said passive infrared motion detector exceeding a predetermined threshold.

19. A mail system, comprising:
a camera;
a microprocessor functionally connected to said camera and to a source of power and to a communications channel;
a software module, operable on said microprocessor, wherein said camera, said microprocessor, said communications channel, said software module, and a motion sensor are functionally connected to said microprocessor and said source of power, and a wireless communications module functionally connected to said source of power, and functionally connected to said microprocessor, and being located in a first housing;
a flashlight functionally connected to said microprocessor and said source of power, and located on an outer surface of said first housing;
a second housing having an internal cavity;
said first housing having an outer surface sized and shaped to conform to an inner surface of said internal cavity;
a coupling device located on said outer surface of said first housing surface for attaching said first to said inner surface of said internal cavity;
the motion sensor directed at an opening of said internal cavity;
a result of an image analysis performed by said software module of an image of said internal cavity obtained using said camera;
wherein said result of said image analysis is a level of importance; and a wireless message, comprising an electromagnetic signal comprising a digital encoding, emitted by said wireless communications module of a change of the level of importance if said change of level of importance exceeds a user selected change of level of importance;
wherein said user selected level of importance is based on a percentage change of pixels of said image and on said preference of said result of analysis of said image of said contents of said mailbox.

* * * * *